United States Patent [19]

Kehoe et al.

[11] 4,317,837

[45] Mar. 2, 1982

[54] TOBACCO-FLAVORED CHEWING GUM

[75] Inventors: Gary Kehoe, Greenwich, Conn.; Wayne J. Puglia, Bellerose Village; Frank Witzel, Saratoga Springs, both of N.Y.; Dominick R. Friello, Danbury, Conn.; Donald A. M. Mackay, Pleasantville, N.Y.

[73] Assignee: Life Savers, Inc., New York, N.Y.

[21] Appl. No.: 210,190

[22] Filed: Nov. 25, 1980

[51] Int. Cl.³ .............................................. A23G 3/30
[52] U.S. Cl. ........................................ 426/3; 426/5; 131/354
[58] Field of Search ........................................ 426/3–6; 131/2, 17 R, 17 AC

[56] References Cited

U.S. PATENT DOCUMENTS

| 865,026 | 9/1907 | Ellis | 426/3 |
| 904,521 | 11/1908 | Ellis | 426/3 |
| 3,826,847 | 7/1974 | Ogawa et al. | 426/3 |
| 3,845,217 | 10/1974 | Ferno | 426/3 |
| 3,876,804 | 4/1975 | Woodcraft | 426/3 |
| 4,093,752 | 6/1978 | Withycombe | 426/3 |
| 4,252,830 | 2/1981 | Kehoe et al. | 426/5 |

Primary Examiner—Jeanette M. Hunter
Attorney, Agent, or Firm—Lawrence S. Levinson; Burton Rodney

[57] ABSTRACT

A tobacco-flavored chewing gum is provided which does not decrease in viscosity upon chewing inasmuch as it is preferably essentially free of water-solubles, and includes gum base containing high levels of inert fillers, such as calcium carbonate or talc in amounts of at least about 50% by weight, softeners, such as lecithin, synthetic non-caloric sweeteners, such as aspartame, saccharin or cyclamates, and tobacco flavors and/or natural tobacco. The chewing gum includes at least about 10% air voids entrapped in the gum base matrix which, upon chewing, become filled with moisture causing a dramatic increase in cud volume.

12 Claims, No Drawings

TOBACCO-FLAVORED CHEWING GUM

The present invention relates to tobacco-flavored chewing gum which includes a chewable gum base containing tobacco and/or tobacco flavorings, inert fillers or texturizing agents in amounts of at least about 50% by weight up to 80% or more, and softeners and optionally, non-caloric sweeteners, in place of the normally high caloric corn syrup, sugar alcohols and sugars. The gum base includes at least about 10% air voids entrapped therein and created during the manufacturing process, which voids are filled with water upon chewing causing a dramatic increase in cud volume of the gum base thereby giving the sensation of chewing tobacco.

Smokeless tobacco, such as chewing tobacco and snuff, has enjoyed recent success due to the cut back in cigarette smoking among the general population. Moreover, use of chewing tobacco has been somewhat limited to, for example, baseball players, farmers and those generally residing in rural areas. The reason for this, in part, is due to the nature of chewing tobacco. The chewing tobacco usually comes packaged as a block; the user merely breaks off a small piece and starts chewing. After a short time, the chewed piece, now referred to as a wad, begins to absorb saliva and consequently starts to swell thereby giving the user the appearance of having his cheeks "stuffed with tobacco." Saliva is continuously generated so that the user must either swallow the resulting "tobacco juice" (which has an unpleasant bitter taste to many and causes a burning irritating sensation in the stomach) or expectorate same. It is the necessity of the latter that usually requires that the user stick to ballfields, farms or other rural areas, or the comfort of his own home, as opposed to populated urban centers.

Accordingly, it should now be readily apparent that a need exists in the market place for a tobacco-like product which is of the smokeless variety, and gives the sensation and pleasure generated from chewing tobacco. Indeed, such a product would be most welcomed if it could provide tobacco flavor coupled with giving the user the sense of security imparted by having a huge tobacco-flavored wad stuffed in one's mouth which causes saliva to be generated to form tobacco juice which need not be expectorated but which can be swallowed without producing the unpleasant burning irritating sensation in the stomach associated with conventional tobacco products.

In accordance with the present invention, a tobacco-flavored chewing gum is provided which is initially soft and chewable, may be calorie-free, if desired, does not decrease in viscosity or shrink upon chewing, but, in fact, expands or swells and remains soft upon prolonged chewing, and produces with saliva a pleasant tasting tobacco-flavored juice which may be swallowed without causing irritation to the stomach. The tobacco-flavored chewing gum composition of the invention contains gum base which includes at least about 10%, and preferably from about 12 to about 18% air voids entrapped in the gum base matrix and has a density ranging from about 1.5 to about 1.75 gm/cc, and preferably from about 1.63 to about 1.67 gm/cc, and further includes one or more inert fillers and/or texturizers, as well as synthetic non-caloric sweeteners, tobacco flavors and/or snuff and/or regular tobacco (where swallowing tobacco juice is not a problem), optionally bulked with relatively tasteless sugars, such as lactose, other flavors and softeners and other conventional, substantially calorie-free or calorie-containing ingredients.

Conventional chewing gum includes a large proportion of plasticizers and softeners which are exemplified by corn syrup and/or sugar alcohols, such as sorbitol, mannitol and/or xylitol. These high calorie components are replaced by the substantially calorie-free fillers and texturizing agents which impart the desired softness and texture to the chewing gum base, as will be seen hereinafter.

The gum base employed in the chewing gum of the invention is initially soft partly due to the relatively large volume of air voids and remains soft. Upon chewing, the gum base does not increase in viscosity, cud volume loss is minimized, and, in fact, air voids within the gum base matrix are filled with saliva thereby causing the cud to swell and form a wad not unlike that experienced when chewing tobacco. Moreover, collection of saliva in the air voids minimizes hydration of the gum base thereby preventing the cud from becoming undesirably soft and inhibiting loss of cohesivity upon chewing.

In some respects, the chewable chewing gum base is more similar to conventional chewing gum in chewing characteristics than to gum base even though it essentially contains only gum base ingredients plus tobacco flavor and possibly sweetener and other flavors. The reason for this is the large volume of air trapped in the gum base, for example at least about 15% trapped air, while conventional chewing gum contains from 10 to 13% trapped air, and chewing gum base contains only 1 to 3% trapped air. However, the air voids present in the gum base present in the chewing gum of the invention become filled with moisture, upon chewing, resulting in a cud volume increase of 100% or more. In contrast, chewing of conventional chewing gum results in a cud volume loss of from 5 to 15%.

The chewing gum of the invention includes a relatively water-insoluble, non-digestable, substantially calorie-free gum base.

As indicated, the fillers and/or texturizing agents are essential components of the gum base. The fillers and texturizing agents are present in an amount of at least about 50%, and preferably ranging from about 55 to about 85% by weight, and more preferably from about 60 to about 85% by weight, and most preferably from about 60 to about 80% by weight of the gum base. Examples of such substantially calorie-free insoluble non-extractable fillers and/or texturizing agents suitable for use herein include, but are not limited to, calcium carbonate, aluminum hydroxide, alumina, magnesium carbonate, dicalcium phosphate, talc ($3MgO.4SiO_2.H_2O$), cellulose, magnesium trisilicate, magnesium hydroxide, aluminum silicates and combinations thereof. Mild abrasives for tooth cleaning or plaque reduction may also be employed without fear of undesirable extraction.

The above fillers and/or texturizing agents will remain in the gum base without significant release, even after chewing for hours.

Other typical examples of the ingredients found in the chewing gum base include masticatory substances of synthetic origin, such as styrene butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 1 to about 5%, preferably from about 1 to about 3%, and optimally from about 1.5 to about 2.5% by weight of chewable gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed, such as pentaerythritol ester gum, polymerized ester gum, and ester gum. The solvent will be employed in an amount ranging from about 2 to about 6%, preferably from about 3 to about 4.5%, and optimally from about 3.75 to about 4.25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers.

The hydrophilic-type detackifier will be employed in an amount within the range of from about 3 to about 7.5% by weight of the gum base, preferably from about 4 to about 6.5% and optimally from about 4.75 to about 5.25% of the gum base.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 7% by weight of the gum base, preferably from about 3 to about 5%, and optimally from about 3.75 to 4.5% by weight. The preferred hard waxes are candelilla wax and paraffin wax employed in combination so that from 0.75 to about 1.25% (based on the weight of the gum base) of the candelilla is employed with from about 2.75 to about 3.25% (base on the weight of the gum base) of the paraffin wax. The waxes are found to reduce the tackiness of the final gum composition without significantly reducing cohesivity thereof.

The gum base may also include a softening agent and lubricant combination which may comprise one or more hydrogenated vegetable or animal fats (Hydrofol) having a high melting point, that is, above about 22° C. and preferably above about 50° C.; such softening agent and/or lubricant may be employed in amounts ranging from about 0 to about 5% by weight of the gum base, preferably from about 0.5 to about 3%, and optimally from about 1 to about 2%. Examples of softeners suitable for use herein include, but are not limited to, glycerol monostearate, lecithin, coconut oil, fatty acids, such as stearic, oleic and palmitic, partially hydrolyzed polyvinyl esters, waxes, such as carnauba wax, candelilla wax and beeswax wax, and cellulose derivatives.

The chewing gum may also contain hydrophilic type plasticizers suitable for use herein, but not limited to partially hydrolyzed polyvinyl acetate, carnauba wax, beeswax, cellulose derivatives, such as methyl cellulose and carboxy methyl cellulose and various hydrophiles, such as propylene glycol and glycerine and combinations of any two or more of the above.

The gum base will also include an emulsifier to impart hydrophilic properties to the gum base so that saliva will be absorbed thereby making the gum base slippery; the emulsifier will be employed in amounts ranging from about 0 to about 10% by weight of the gum base, preferably from about 3 to about 9%, and optimally from about 6 to about 8%. Examples of such emulsifiers include glyceryl monostearate, phosphatides, such as lecithin and cephalin, Tweens, Spans and mixtures thereof.

In addition, the gum base may include colorants, such as titanium dioxide, plasticizers, such as lanolin, stearic acid, sodium stearate, potassium stearate and the like, antioxidants, in an amount up to 1000 ppm of the gum base, such as butylated hydroxyanisole, butylated hydroxy-toluene, and propyl gallate.

The chewing gum may also include water in amounts ranging from about 0 to about 3% by weight, and preferably from about 0.5 to about 2.5% by weight, and most preferably, as little water as possible.

The gum base including the built-in air voids is prepared by heating and/or blending the various ingredients as mentioned above as described hereinafter.

The chewing gums of the invention will be flavored with natural or synthetic tobacco flavorings. Thus, in one embodiment, standard tobacco flavorings may be mixed with and/or into the gum base. Examples of tobacco flavorings which may be employed includes 2,4,6-triisobutyl-1,3,5-trioxane disclosed in U.S. Pat. No. 4,093,752 and buffered nicotine disclosed in U.S. Pat. No. 3,845,217, as well as mixtures of tobacco and wax as disclosed in U.S. Pat. Nos. 865,026 and 904,521. The above tobacco flavorings may be employed in conjunction with non-sweet tastes or flavorings, such as salt, peppery, sour, bitter, meaty, with or without sweeteners, as desired. The use of such flavorings with the tobacco flavorings should allow the consumer to swallow the aesthetically pleasing saliva generated from chewing the tobacco flavored chewing gum of the invention.

In an alternative form of the present invention, snuff or regular tobacco milled into the gum base offers a cohesive vehicle for tobacco particles. However, the above-mentioned non-sweet flavorings should be employed where it is desired to form aesthetically pleasing saliva.

The amounts of tobacco or tobacco flavorings employed in the chewing gum will depend upon the nature of the flavorant and are disclosed in the various patents mentioned above.

As indicated, the gum base may also include flavoring, such as sour or fruit flavoring or non-acid or mint flavoring in an amount ranging from about 0.1 to about 2% by weight of the final chewable gum base product. The flavoring may comprise synthetic flavors and oils derived from plants, leaves, flowers, fruit, etc. Representative fruit flavor adjuncts include acids, such as adipic, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

As indicated, in an alternative embodiment, the chewing gum may include a sweetener-bulking agent which will be employed in an amount of from about 30 to about 80% by weight, and preferably, from about 45 to about 70% by weight.

Examples of sweetener-bulking agents which may be employed herein include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as polyols, such as sorbitol, mannitol, xylitol, mixtures thereof and mixtures with one or more of the above sugars.

The chewing gum of the invention may also contain an artificial sweetener, such as, for example, aspartame, cyclamate, or a saccharin or other sweetener as set out hereinafter, the artificial sweetener being present in an amount of from about 0 to about 0.5% by weight, and preferably, from about 0.05 to about 0.2% by weight.

Examples of artificial sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalamine methyl ester, (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

Where long-lasting sweetness is desired, the sweetener may be employed in particulate form so as to have an average particle size of less than 150 microns, and preferably less than 100 microns.

The chewing gum of the invention including the air voids may be prepared as follows. A standard gum base or bases, comprising approximately 15 to 35% of the total product, is added to a steam jacketed kettle equipped with a sigma blade mixer. The temperature of the kettle is maintained at about 140°–180° F. At this point softener, such as lecithin is added to the base and mixed for several minutes. Filler-texturizer, such as calcium carbonate is then added slowly. The quantity of this finely divided water insoluble material is such that the mixture begins to tear apart, forming discrete pieces of base, emulsifier, finely divided water insoluble, and air. Flavor including tobacco or tobacco flavoring and synthetic sweetener are then added. The plasticizing action of the flavor brings the mass together where it can be removed from the kettle and formed into a desired shape, such as sticks, tablets, blocks and the like.

The following Examples represent preferred embodiments of the invention.

EXAMPLE 1

A chewable gum base having the following composition is prepared as described below.

TABLE I

| CHEWABLE GUM BASE | |
| --- | --- |
| Ingredients | Parts by Weight |
| PVA (polyvinyl acetate) | 5 |
| CaCO$_3$ | 75 |
| SBR copolymer | 2 |
| Arochem | 2 |
| Hydrofol | 1 |
| Candelilla wax | 1 |
| Glyceryl monostearate | 1 |
| Paraffin wax | 3 |
| Stabelite ester No. 5 | 2 |
| BHA | 0.01 |
| Lecithin | 7 |
| Aspartame | 1 |
| Flavor | 1 |

Polyvinyl acetate, styrene-butadiene copolymer, Arochem (glyceryl ester of dimerized rosin), Hydrofol (hydrogenated animal fat), candelilla wax, paraffin wax, glyceryl monostearate, Stabelite ester No. 5 (hydrogenated glyceryl ester of rosin), and BHA (butylated hydroxyanisole) are added to a steam jacketed kettle equipped with a sigma blade mixer. The temperature of the mixer is maintained at 160° F. At this point, lecithin is added and the mix is mixed for several minutes. Calcium carbonate is then added slowly. The mixture begins to tear apart, forming discrete pieces of base and emulsifier, finely divided water-insoluble and air. Flavor and sweetener are then added and mixed for about 1 minute. The plasticizing action of the flavor brings the mass together where it is removed from the kettle and formed into sticks or cubes.

The so-formed chewable gum base of the invention is comprised of about 98.5% gum base, has an almost non-existent calorie content of 0.235 calories per gram (less than one calorie per piece), does not increase in viscosity upon chewing, even in the presence of a dramatic increase in cud volume due to an external hydration. The unexpected cause of this phenomena is the fact that at least 15% air is entrapped in the gum base matrix upon chewing. The air voids become filled with moisture, resulting in the cud volume increase. The absence of water-soluble extractables insures against disintegration and that the basic formula does not change upon chewing.

In order to demonstrate the advantages of the chewable gum base, the chewable gum base prepared as described above is compared with conventional sugarless chewing gum and conventional chewing gum base. The composition of the conventional gum base is outlined below.

TABLE II

| TYPICAL CONVENTIONAL GUM BASE | |
| --- | --- |
| Ingredient | Parts by Weight |
| Candelilla wax | 5 |
| Paraffin wax | 13 |
| Polyvinyl acetate | 22 |
| SBR copolymer | 9 |
| CaCO$_3$ | 20 |
| Stabelite ester No. 5 | 11 |
| Arochem | 7 |
| Hydrofol | 7 |
| Glyceryl monostearate | 6 |

Upon examination of the conventional chewing gum, chewable gum base and conventional gum base, the following results are obtained.

Conventional sugarless chewing gum, containing mostly water soluble sweeteners, binders and the like, undergoes a decrease in cud volume from 0 time through 30 minutes. It is normally assumed, however, that almost all of the water solubles are chewed out of the gum after five minutes, leaving only gum base, flavor and perhaps some traces of water solubles. In order to demonstrate the above, cud volumes of the conventional sugarless gum are calculated starting at 5 minutes (no water solubles), 10, 15, and 20 minutes. The result is an overall decrease in cud volume of 8% throughout this period. This indicates loss of volume and no moisture pick up because hydration occurs during processing and not during chewing.

By contrast, cud volumes of the chewable base product of the invention are calculated at 0 time, every 5 minutes to 20 minutes and an increase in volume of over 100% is noted. This indicates a dramatic moisture gain without decomposition.

A complete summary of the similarities and differences between chewing gum, chewing gum base, and chewable gum base are outlined below.

| Mechanism | Conventional Chewing Gum | Invention-Chewable Gum Base | Conventional Gum Base |
|---|---|---|---|
| Ease of chewing | Soft | Soft | Hard |
| Air Content | 12% | 15% | 1.7% |
| Hydration Method | In Kettle | Upon Chewing | No Hydration |
| % Water Solubles | 70-80% | 1.3% | 0% |
| % Volume Change | −8% | +100% | Not chewable |
| Site of Hydration | Mostly hydrophilic | Mostly hydrophobic | Mostly hydrophobic |
| Air Entrapment | Due to finely divided water soluble | Due to finely divided water insoluble | Not applicable |

EXAMPLE 2

A tobacco-flavored chewing gum in accordance with the present invention is prepared from the following ingredients:

| Ingredients | Parts by Weight |
|---|---|
| Gum base (as disclosed in Ex. 1) | 20 |
| Sorbitol | 50 |
| Sorbitol solution (70% solids) | 24.6 |
| Lecithin | 0.2 |
| Citric acid | 0.5 |
| Fumaric acid (passes through a U.S. 140 mesh screen) | 2 |
| Free saccharin acid (passes through a U.S. 140 mesh screen) | 0.2 |
| Tobacco flavoring | 2.5 |

The gum base is melted (temperature 270°) and placed in a standard dough mixer kettle equipped with sigma blades. The lecithin, sorbitol and sorbitol solution are added and mixed for 2 minutes at 200°. At the time the mix is folding well, powdered free saccharin and powdered fumaric acid are added to the base-syrup mix and the mixture is mixed for 1 minute at 200°. Thereafter, the tobacco flavoring, citric acid, and coloring agents are added and blended with the above mixture for 5 minutes at 160°. The resulting gum is discharged from the kettle and is rolled, scored and wrapped.

What is claimed is:

1. A tobacco-flavored chewing gum which simulates chewing tobacco, comprising gum base, from about 50 to about 95% by weight of a substantially calorie-free inert filler or texturizing agent dispersed in said gum base, said filler or texturizing agent being selected from the group consisting of calcium carbonate, aluminum hydroxide, alumina, magnesium carbonate, talc, aluminum silicates, dicalcium phosphate, magnesium trisilicate, magnesium hydroxide, cellulose and mixtures thereof, said gum base including at least 10% air voids entrapped in the gum base matrix, which, upon chewing, become filled with moisture, and tobacco flavoring mixed with said gum base, said chewing gum also containing from about 0.1 to about 5% by weight of a synthetic sweetener or from about 30 to about 80% by weight of a natural sweetener.

2. The chewing gum as defined in claim 1 further including from about 5 to about 10% by weight of a softener.

3. The chewing gum as defined in claim 1 wherein said filler or texturizing agent is calcium carbonate or alumina or mixtures thereof.

4. The chewing gum as defined in claim 2 wherein said softener is selected from the group consisting of lecithin, coconut oil, fatty acids, glycerol stearate, polyvinyl alcohol, cellulose derivatives and mixtures thereof.

5. The chewing gum as defined in claim 1 further including from about 0.1 to about 5% by weight of a sweetener selected from the group consisting of sodium saccharin, calcium saccharin, ammonium saccharin, the free acid form of saccharin, sodium cyclamate, calcium cyclamate, free cyclamic acid, dihydrochalcones, glycyrrhizin, glycyrrhizic acid ammonium salt, L-aspartyl-L-phenylalanine methyl ester and mixtures thereof.

6. The chewing gum as defined in claim 1 further including additional flavor.

7. The chewing gum as defined in claim 1 wherein said filler or texturizing agent is present in an amount within the range of from about 60 to about 80% by weight of said gum base.

8. The chewing gum base defined in claim 1 including from about 12 to about 18% by weight air voids in said gum base matrix.

9. The chewing gum as defined in claim 1 having a density within the range of from about 1.5 to about 1.75 gm/cc.

10. The chewing gum as defined in claim 1 further including from about 30 to about 80% by weight of a natural sweetener.

11. The chewing gum as defined in claim 1 wherein said tobacco flavoring comprises synthetic tobacco flavoring.

12. The chewing gum as defined in claim 1 wherein said tobacco flavoring comprises natural tobacco.

* * * * *